US012679206B2

(12) United States Patent (10) Patent No.: US 12,679,206 B2

Whinnery et al. (45) Date of Patent: Jul. 14, 2026

(54) VISUALIZATION OF EXTERNAL AUDIO COMMANDS

(71) Applicant: Zoox, Inc., Foster City, CA (US)

(72) Inventors: Joseph Whinnery, Soquel, CA (US); Venkata Subrahmanyam Chandra Sekhar Chebiyyam, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 60 days.

(21) Appl. No.: 18/655,766

(22) Filed: May 6, 2024

(65) Prior Publication Data

US 2025/0340118 A1 Nov. 6, 2025

(51) Int. Cl.
*B60K 35/22* (2024.01)
*G10L 15/26* (2006.01)
*G10L 17/00* (2013.01)

(52) U.S. Cl.
CPC .............. *B60K 35/22* (2024.01); *G10L 15/26* (2013.01); *G10L 17/00* (2013.01)

(58) Field of Classification Search
CPC ......... B60K 35/22; G10L 15/26; G10L 17/00
See application file for complete search history.

(56) References Cited

U.S. PATENT DOCUMENTS

| | | | |
|---|---|---|---|
| 9,679,487 B1 * | 6/2017 | Hayward | ............. G08G 1/0965 |
| 11,393,108 B1 * | 7/2022 | Modestine | ....... G08B 13/19636 |
| 2005/0074131 A1 | 4/2005 | Mc Call et al. | |
| 2018/0053413 A1 | 2/2018 | Patil et al. | |
| 2018/0077506 A1 | 3/2018 | Wacquant et al. | |
| 2019/0220248 A1 * | 7/2019 | Cordourier Maruri | ..................... |
| | | | G06F 3/167 |
| 2022/0406106 A1 | 12/2022 | Talwar et al. | |
| 2024/0336273 A1 * | 10/2024 | Wuorinen | ....... B60W 60/00182 |

OTHER PUBLICATIONS

International Search Report and Written Opinion dated Aug. 11, 2025 for PCT Application No. PCT/US2025/025769.

* cited by examiner

*Primary Examiner* — Brandon D Lee
(74) *Attorney, Agent, or Firm* — EIP US LLP

(57) ABSTRACT

This disclosure relates to methods, systems, and techniques for visualizing external audio captured by a microphone of the vehicle. Using the techniques described herein, external audio signals may be interpreted and converted into clear visual indicium that can be understood by individuals associated with the vehicle, such as passengers inside the vehicle or individuals awaiting pickup.

20 Claims, 7 Drawing Sheets

204

NETWORK(S)
352

402

354

380

108

102

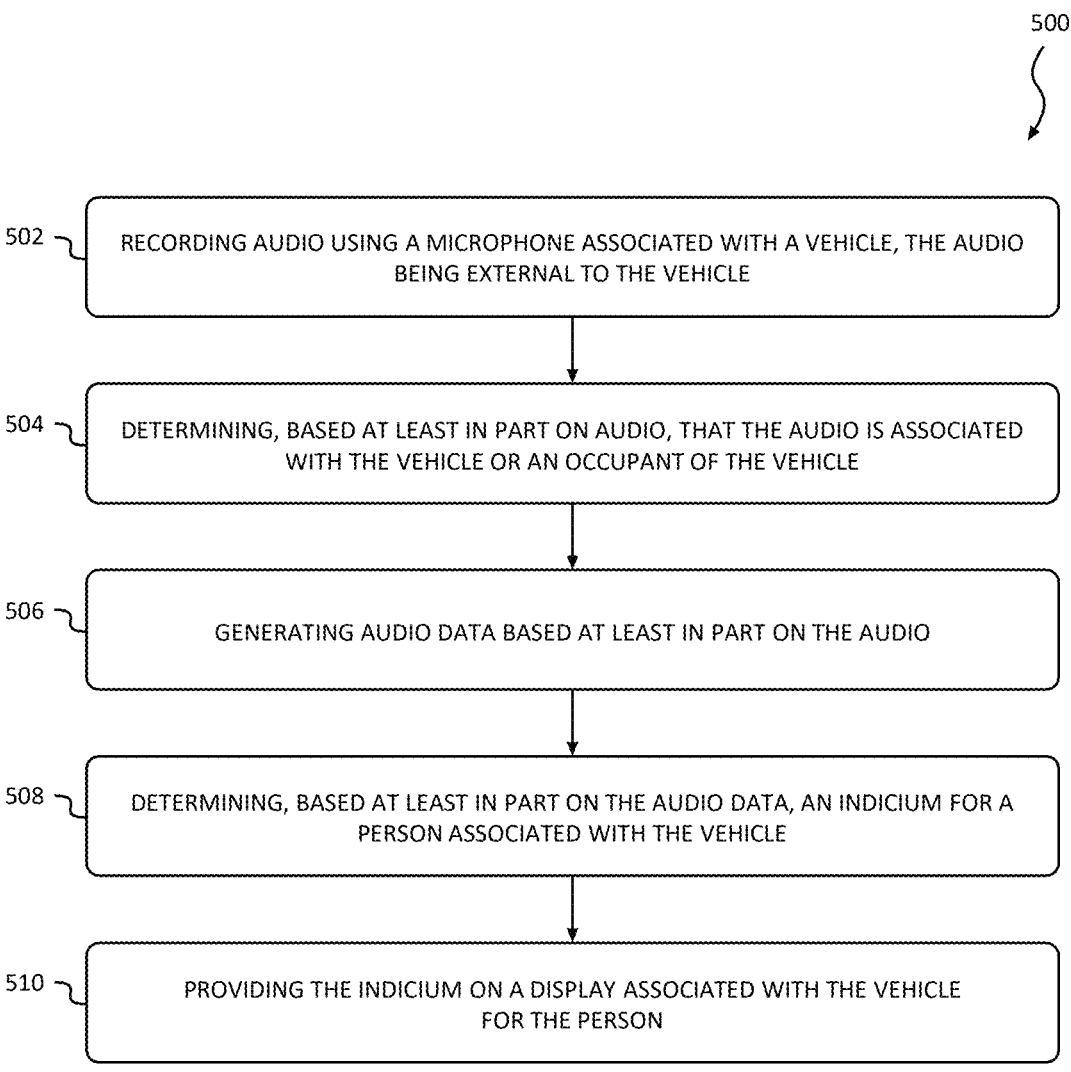

500

502 — RECORDING AUDIO USING A MICROPHONE ASSOCIATED WITH A VEHICLE, THE AUDIO BEING EXTERNAL TO THE VEHICLE

504 — DETERMINING, BASED AT LEAST IN PART ON AUDIO, THAT THE AUDIO IS ASSOCIATED WITH THE VEHICLE OR AN OCCUPANT OF THE VEHICLE

506 — GENERATING AUDIO DATA BASED AT LEAST IN PART ON THE AUDIO

508 — DETERMINING, BASED AT LEAST IN PART ON THE AUDIO DATA, AN INDICIUM FOR A PERSON ASSOCIATED WITH THE VEHICLE

510 — PROVIDING THE INDICIUM ON A DISPLAY ASSOCIATED WITH THE VEHICLE FOR THE PERSON

FIG. 5

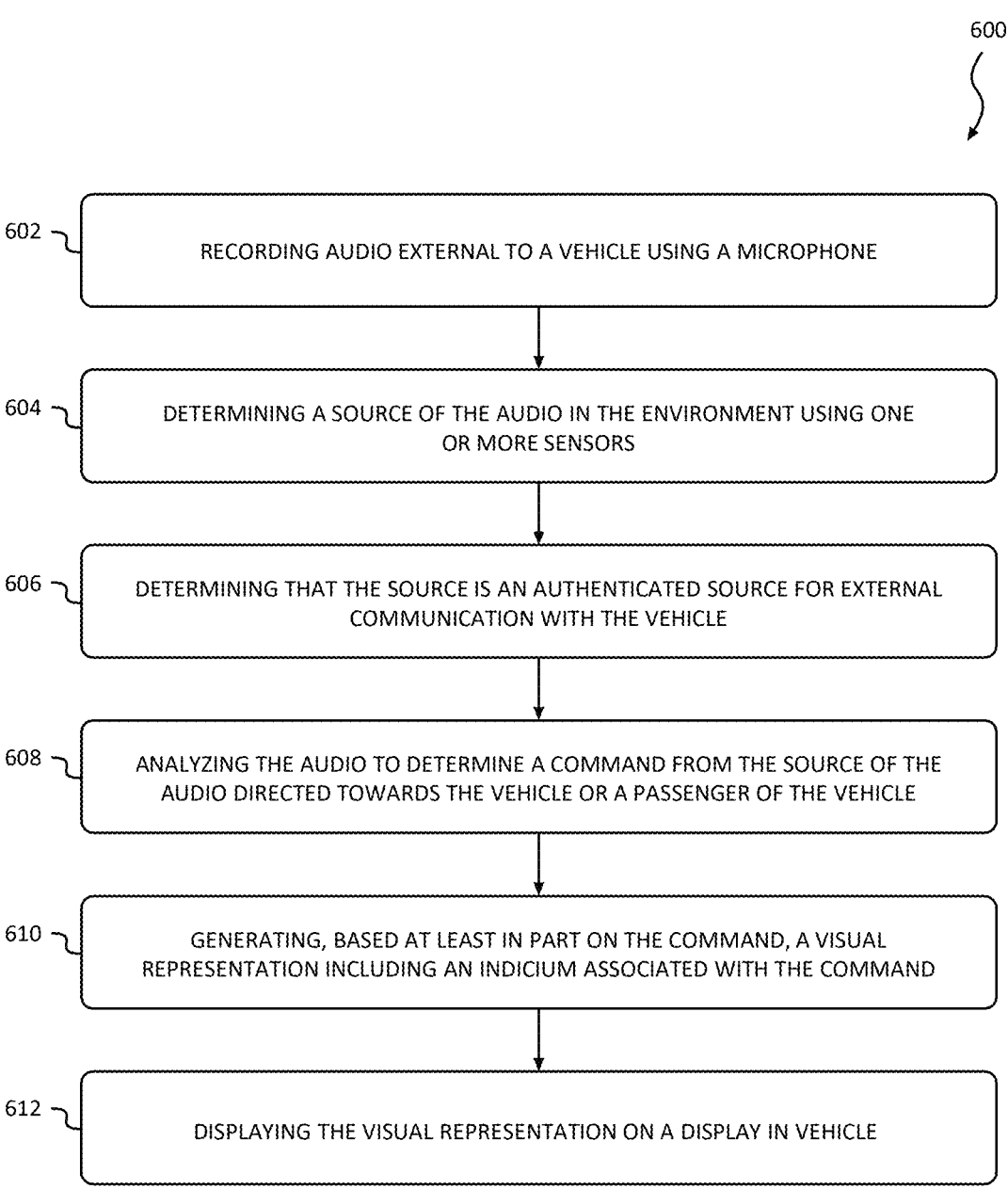

600

602 ── RECORDING AUDIO EXTERNAL TO A VEHICLE USING A MICROPHONE

604 ── DETERMINING A SOURCE OF THE AUDIO IN THE ENVIRONMENT USING ONE OR MORE SENSORS

606 ── DETERMINING THAT THE SOURCE IS AN AUTHENTICATED SOURCE FOR EXTERNAL COMMUNICATION WITH THE VEHICLE

608 ── ANALYZING THE AUDIO TO DETERMINE A COMMAND FROM THE SOURCE OF THE AUDIO DIRECTED TOWARDS THE VEHICLE OR A PASSENGER OF THE VEHICLE

610 ── GENERATING, BASED AT LEAST IN PART ON THE COMMAND, A VISUAL REPRESENTATION INCLUDING AN INDICIUM ASSOCIATED WITH THE COMMAND

612 ── DISPLAYING THE VISUAL REPRESENTATION ON A DISPLAY IN VEHICLE

FIG. 6

VISUALIZATION OF EXTERNAL AUDIO COMMANDS

BACKGROUND

A vehicle may include various sensors, which may be utilized for many different purposes. For example, a microphone may be used to detect information about a surrounding environment, by capturing audio representing sound in an environment where the vehicle is located. In some instances, the audio may comprise information intended for the vehicle or an occupant of the vehicle. As such, effective processing and interpretation of the audio may be important to allow individuals associated with the vehicle to respond appropriately to external communications.

BRIEF DESCRIPTION OF DRAWINGS

The detailed description is described with reference to the accompanying figures. The use of the same reference numbers in different figures indicates similar or identical components or features.

FIG. 5 depicts an example process for visualization of information from external audio, in accordance with examples of the disclosure.

FIG. 6 depicts an example process for visualization of information from external audio, in accordance with examples of the disclosure.

DETAILED DESCRIPTION

Figure 1:
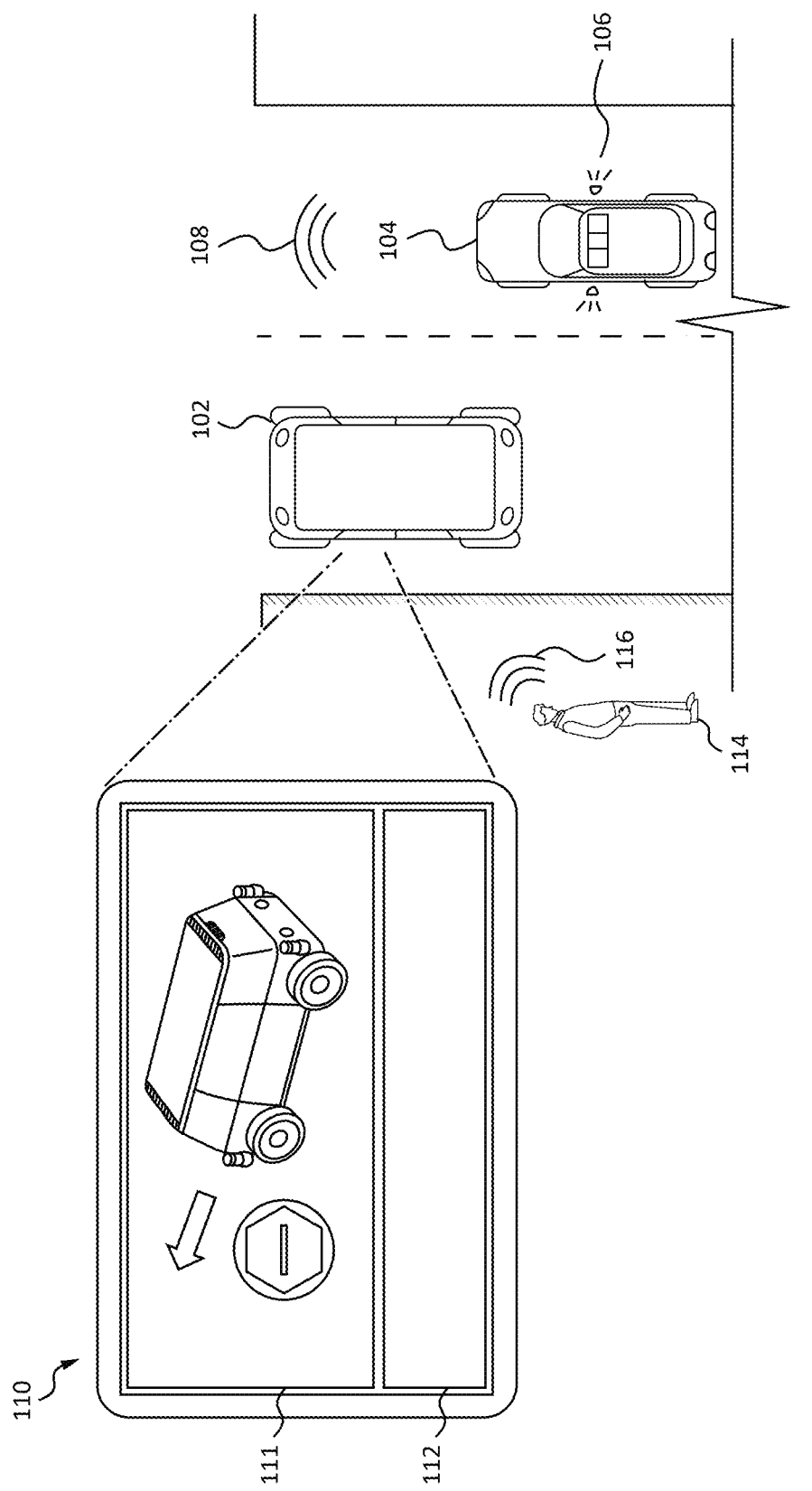
FIG. 1 is a schematic diagram illustrating an example implementation of visualization of information from external audio from various sources, in accordance with examples of the disclosure.

This disclosure pertains to techniques, procedures, and systems, including methods and computer-readable media, for the visualization of external audio captured by a microphone of a vehicle. The vehicle may be an autonomous vehicle (AV) including one or more microphones to capture sounds (i.e., recording audio) from the environment traversed by the vehicle. While maintaining a serene cabin environment is often valued by passengers for their comfort and tranquility, it can inadvertently obscure crucial external auditory information, such as directives from first responders or law enforcement officers (LEOs). These directives may include commands targeted at the vehicle or its occupants and may in example impact the operational decisions of the vehicle, such as altering pickup timings for awaiting individuals. The scope of these commands encompasses a variety of instructions, ranging from safety measures requiring pedestrians to avoid certain areas, to critical alerts about imminent dangers like earthquakes or tsunamis, and procedural guidance during civic disturbances, such as instructing individuals to exit the vehicle for safety reasons. Advantageously, using the techniques described herein, external audio signals may be interpreted and converted into clear visual indications, or indicia, which can be easily understood by individuals associated with the vehicle, whether they are passengers inside the vehicle or individuals awaiting pickup. This visual representation of external auditory commands may offer benefits, particularly enhancing accessibility for passengers with hearing impairments, such as those who are deaf or hard of hearing, thereby ensuring their safety and comfort. By leveraging audio processing capabilities of the vehicle, the system and methods described herein aims to bridge communication gaps, ensuring vital information is conveyed effectively, enhancing the passenger experience, and/or promoting inclusive safety measures.

Certain vehicles, such as AVs, may include one or more sensors, such as a light detection and ranging (LIDAR) sensor, radar sensor, ultrasonics, camera or microphone, to name a few, to gather information of the environment being traversed by the AV. Sensor data may for example comprise visual information, spatial information or temporal information relating to the environment traversed by the AV. In some examples, a combination of different data may be used, such as for example audiovisual data including both images/video and audio. The sensor data captured by the one or more sensors may be analyzed and used to control the AV. Even if the analysis for real time control of the AV may take place onboard the AV, in some embodiments, sensor data (point cloud, audio, video, images) from the one or more sensors may need to be transmitted from the AV to e.g., a remote computing device, to be further analyzed. The result of such analysis may be transmitted back to the vehicle and used to control the operations of the vehicle.

The microphones of the vehicle can be configured to capture and record audio external to the vehicle traversing an environment. The captured and recorded audio may be processed to determine audio data. The audio data may be a digital or other version of the captured audio. In some examples, the processing involves preprocessing measures such as noise cancellation to reduce background interference, normalization to adjust the volume, attenuation to diminish certain parts of the audio that are not required, and amplification to increase the clarity and volume of specific segments of importance, etc. Furthermore, the processing may also involve the identification and classification of distinct sounds or sections within the audio.

Using the recorded audio and/or the audio data, it can be determined whether the audio is associated with the vehicle or occupant of the vehicle. For example, the audio may be analyzed to determine the semantical content of the audio, to determine whether the audio is intended for the vehicle or the occupant of the vehicle. In examples, if the content is determined to include certain cues, such as warnings or other content that may be important for an individual associated with the vehicle to know about, it may be determined that the audio is associated with the vehicle or occupant of the vehicle. If it is determined that that the audio is not associated with the vehicle or occupant of the vehicle the process of further analyzing of the audio to determine an indicium to be visualized, as described herein, may be aborted.

In examples, if a source of the audio is an authenticated source for external communication with the vehicle, it may be determined that the audio is associated with the vehicle or occupant of the vehicle. In examples, the source of the audio being recorded by the microphone of the vehicle may be determined using sensors of the vehicle. For example, direction of arrival (DOA) of the audio may be calculated using a plurality of microphones. An example of such a DOA calculation may be the same as described in U.S. Pat. No. 11,336,998 entitled "Direction of Arrival Estimation" filed on Dec. 18, 2020, the entire contents of which are hereby incorporated by reference for all purposes. This DOA information can then be cross-referenced with the data from other vehicle sensors, such as LIDAR, radar, and cameras, to identify the physical object in the vicinity of the vehicle that is generating the sound. Once the source is located, its characteristics, such as visual signals, audio patterns, or wireless signals, may be analyzed to verify whether it qualifies as an authorized entity for external communication with the vehicle. For instance, an emergency vehicle may be authenticated based on specific indicators like the flashing of emergency lights, the distinct sound of sirens, or wireless signals identified through protocols like Bluetooth or 5G. Moreover, the system can be configured to recognize audio cues within the recorded sounds that signify an authorized source. This may involve detecting specific tones, rhythms, or sequences known to be used by trusted sources. In some examples, Dedicated Short-Range Communication (DSRC) can be utilized to authenticate sources of audio in a vehicle context. DSRC technology is designed for vehicle-to-vehicle (V2V) and vehicle-to-infrastructure (V2I) communication, providing a secure and reliable way to exchange information among vehicles and between vehicles and road-side units. In the context of authenticating sources of audio, DSRC can thus be used. For example, when an emergency vehicle broadcasts audio commands or signals, DSRC can be used to verify the origin of those signals. This may be achieved through secure communication protocols that confirm the identity of the transmitting entity. For instance, if a police car sends a command via its public address system, it can also transmit a corresponding signal through DSRC that contains authentication data. This way, the receiving vehicle can cross-check the audio signal with the DSRC transmission to ensure the command comes from a legitimate source.

Authorized agents or entities, like first responders and traffic control personnel, can in other examples be identified through machine-learned models analyzing pedestrian gestures and attributes. Further techniques for authorizing an entity are described in in U.S. Pat. No. 11,710,352 entitled "Machine-learned model training for pedestrian attribute and gesture detection" filed on May 21, 2020, the entire contents of which are hereby incorporated by reference for all purposes. Such capability may allow the system to ascertain whether the audio source is authorized for external communication, facilitating a secure and informed interaction with the surrounding environment.

In some examples, if the audio source is not determined to be authorized, the process of analyzing of the audio to determine an indicium to be visualized to the individual may be aborted. This precautionary measure ensures that audio content, including any embedded commands, is not translated into visual cues if the authenticity or trustworthiness of the source to the audio cannot be confirmed. By implementing this safeguard, the system enhances overall security and mitigates the risk of displaying inaccurate or potentially misleading information, thus ensuring that only verified communications influence the visual indicators presented to the individuals associated with the vehicle.

In some examples, the system may detect when an audio source is unauthorized or potentially deceptive. If the origin of the audio is uncertain, the process that would normally convert audio cues into visual signals (indicium) for the user may shift to issuing a warning. This measure may prevent unauthorized or potentially harmful commands from being translated into visual guidance that might mislead users or affect vehicle operations. Moreover, the passenger of the AV may be alerted of potential risks involving imposters.

In some examples, the audio or audio data is analyzed to determine a command directed towards the vehicle or a passenger of the vehicle. Such a process may for example include feature extraction, voice activity detection, speech recognition and command detection. The command detection may for example be achieved using natural language processing (NLP) techniques, which allow the system to understand and interpret human language. If it is determined that the command is not directed towards the vehicle or a passenger of the vehicle, this may in turn be used to determined that the audio is not directed towards the vehicle or a passenger of the vehicle, and the method may be aborted as discussed herein.

In some examples, other sensor data can complement audio analysis to confirm or enhance the detection of a command directed towards the vehicle or its passengers. For example, in addition to analyzing voice-based cues, the system can use video data to determine the command. For example, the video data can be used to determine if a LEO is pointing to a specific area, indicating a command to the vehicle to move to or stop at the area, or that the passenger should avoid or proceed to this area upon exiting the vehicle. A further example involves analyzing infrared sensor data to detect hand gestures or body movements from authorized personnel. If an infrared sensor detects a specific gesture pattern such as a raised hand indicating "stop" or a wave indicating "go" this data can validate the audio analysis to confirm the intended command.

In examples, a visual representation including an indicium associated with the command (or otherwise associated with the recorded audio/audio data) may be generated. As used herein, "indicium" or "indicia" determined from audio, for example associated with a command, refers to a visual representation or symbol(s) that signifies information derived from the external audio. For instance, if the system processes audio (potentially in combination with analyzing sensor data from other types of sensors as described herein) and recognizes a command or important information (like a warning from a law enforcement officer or an emergency alert) in the recorded audio, the corresponding indicium could be an icon, text, or any form of visual alert displayed on a display associated with the vehicle (e.g., display or dashboard of the vehicle, or display of a handheld device associated with the vehicle). This serves to inform an individual associated with the vehicle and having access to the display, such as a passenger or person waiting for pickup, about the external audio cue without needing them to hear or interpret the sound directly. In some examples, the indicium may be a textual description of the command, for example the detected language in the audio, or an interpretation or summary of the detected language in the audio.

In examples, a database including mappings between the command, or meaning of the command, and indicia/visual representations may be employed, for example mapping certain commands to certain icons or images. This setup allows for the low complexity translation of particular commands into designated icons or symbols. In examples, the indicium may be determined and updated over time, based at least in part on a position of the vehicle in the environment as well as on an area in the environment which the passenger of the vehicle should avoid or proceed to upon exiting the vehicle as detected in the command. Such dynamic adaptation may ensure that the visual cues remain relevant and accurate, aiding in clear and effective communication. Advantageously, a path to a restricted or emergency area in the environment may be visualized for the passengers of the vehicle, such that the command derived from the audio of the environment may be followed.

In some examples, in addition to the indicium provided on a display associated with the vehicle or without a visual indium, other types or indicium may be determined and provided to the passenger of the vehicle. In some examples, the audio recorded by the microphones of the vehicle, or audio determined based on the recorded audio may be played to the passengers in the vehicle using the speakers of the vehicle. For example, the audio played to the passengers may be an improved version (using noise cancellation, audio enhancement, etc.) of the recorded audio. Alternatively, the audio played to the passengers may be pre-recorded, selected based on the original recorded audio or commands determined based at least in part from the recorded audio. Pre-recorded audio may also be used to direct the attention of the passengers to the display.

In some examples, the further indicium may include a light pattern projected onto a surface. Such projection can serve various purposes, such as indicating walkable areas or zones to avoid outside the vehicle. The specific pattern and placement of the projected light may be based on the commands derived from the recorded audio. For instance, if the system identifies a command directing pedestrians or passengers to a specific area, the light projection might highlight a safe path to follow. Conversely, if warnings about hazardous areas are detected in the recorded audio, the projection can delineate regions to steer clear of, enhancing safety and providing visual guidance to both vehicle passengers and pedestrians. Examples of light projection techniques are described in in U.S. patent Ser. No. 17/554,345 entitled "Projected Interface Envelopes with Vehicle Components" filed on Dec. 17, 2021, the entire contents of which are hereby incorporated by reference for all purposes.

In some examples, the further indicium comprises locking or unlocking specific doors of the vehicle to facilitate that the passengers avoid restricted areas or exit the vehicle to get to the directed areas. In some examples, the vehicle may be controlled to drive to the area which the passengers are directed to.

In examples, the procedure of processing the captured audio to identify and generate a corresponding indicium for display to individuals associated with the vehicle can be executed using onboard computing resources of the vehicle. In other embodiments, an external computing device may be employed. In examples, audio data derived from the captured audio may be transmitted to a computing device external to the vehicle. The external computing device may then determine the command directed to the vehicle or a passenger of the vehicle, at least in part by applying, at the computing device, a speech-to-text algorithm to the audio data. When the command directed towards the vehicle or its passengers is identified, it may be relayed back to the vehicle and manifested visually on the appropriate display interface. An advantage of such distributed approach, involving both onboard and external processing, may be that it offers the flexibility and scalability. Leveraging external computing resources may allow for more complex analysis and access to continually updated algorithms, thereby enhancing the accuracy and depth of audio interpretation. Additionally, offloading computational tasks may reduce the demand on the internal systems of the vehicle, preserving onboard resources for other critical functions and ensuring that the computing capabilities of the vehicle do not become a bottleneck.

The speech-to-text conversion process can be implemented using a variety of methods. These methods range from Neural Language Models (NLMs) to Large Language Models (LLMs), among others. NLMs are typically designed to understand, interpret, and generate human language by learning from vast datasets, thereby capturing the intricacies and nuances of speech. LLMs, which are a subset of NLMs, extend these capabilities by being trained on even larger datasets, enabling them to handle a broader range of language tasks and understand context more deeply.

Natural language processing (NLP) may be used to interpret the textual data received from the speech-to-text algorithm, to understand commands and/or their intended actions. For example, NLP may implement named entity recognition (NER) which identifies and classifies key elements in text into predefined categories, such as the names of people, organizations, locations, dates, and times. The NLP is typically trained to extract commands from audio, particularly those issued by law enforcement officers or first responders, using a large dataset of relevant audio recordings. The audio recordings may be recorded live by other AVs or synthesized from such recordings. The dataset may be diverse, covering various scenarios, accents, speech rates, and backgrounds to create a robust training foundation.

In examples, the command identified through the methods outlined above, such as using NLMs or LLMs and NLPs, may in examples be communicated to a remote operator associated with the vehicle. The operator may ensure the accuracy and relevance of the command by providing an additional layer of verification and input. The remote operator may provide input to the system to update the command. In examples, the process may include play back of the audio data to the remote operator while the remote operator is reviewing the command. This allows the operator to review the semantic content of the audio against the interpreted command. If discrepancies are identified or if improvements can be made, the remote operator has the authority to modify or update the command accordingly.

Following any adjustments, the updated command (which may be the same as, or different to, the originally interpreted command) can be sent back to the vehicle, where it can be transformed into a visual indicium for the occupants or individual otherwise associated with the vehicle. This iterative process may ensure a higher level of accuracy and reliability in the translation of audio commands into actionable visual cues, thereby enhancing the communication chain between external sources and the individual associated with the vehicle.

In examples, the onboard computing resources of the vehicle determines the command from the audio and transmits the command and optionally the audio to the remote operator for validation and possibly updating of the command as described above. In examples, any preprocessing (e.g., noise cancellation) may be performed at the vehicle and/or at the remote computing device.

The methods described herein offer versatile solutions of how to communicate a content of external audio received by a vehicle to an individual associated with the vehicle. Similarly, the methods provide reliable means to ascertain that messaging based on the external audio to an individual associated with the vehicle is correct and relevant for the individual. Furthermore, the techniques described herein may provide a robust framework for promptly identifying any unauthorized source of the external audio thereby maintaining optimal system performance and safeguarding against potential misleading commands communicated to passengers of the vehicle or any other individual associated with the vehicle. These streamlined processes may not only improve the reliability of vehicular systems but also contribute to the overall improvement of operational efficiency and user safety. The end result may be a more intuitive and dependable interaction between vehicles and their human counterparts, paving the way for enhanced navigational aids, emergency response communications, and overall vehicular autonomy.

Examples are provided below with reference to FIGS. 1-8. Examples are discussed in the context of autonomous vehicles (AV); however, the methods, apparatuses, and components described herein are not limited to autonomous vehicles. In one example, the techniques described herein may be utilized in driver-controlled vehicles.

FIG. 1 is a schematic diagram illustrating an example implementation of the techniques described herein, in accordance with embodiments of the disclosure.

FIG. 1 shows an environment traversed by the vehicle 102. The environment comprises a plurality of sources 104, 114 of audio 108, 116. The audio source(s) may include at least a vehicle 104 driving in a same direction as the vehicle 102, and a pedestrian 114 standing on the sidewalk. In the example illustrated in FIG. 2, the vehicle 104 driving in a same direction as the vehicle 102 is an emergency vehicle. Emergency vehicle(s) designated and authorized to respond to an emergency in a life-threatening situation may include, but are not limited to a police car, a police motorcycle, a special weapons and tactics (SWAT) vehicle, a firefighting apparatus, an ambulance, etc. Emergency vehicle(s) may be configured with audible and visual warning devices 106, which are designed to facilitate their movements through traffic to reach the destination or to provide certain protection on the scene. The emergency vehicle, and their occupants, may herein be referred to as a first responders or law enforcement officers (LEOs).

The vehicle 102 comprises at least one microphone configured to record audio 108, 116 external to a vehicle from the environment which the vehicle traverses. From the recorded audio, it can be determined whether the audio 108, 116 is associated with the vehicle 102 or the occupant of the vehicle 102. For example, the semantical content or intent of the audio may be determined and compared to a predefined list of intents to determine whether the audio 108, 116 is associated with the vehicle 102 or the occupant of the vehicle 102. In some examples, a source 104, 114 of the audio 108, 116 in the environment using one or more sensors associated with the vehicle 102 may be determined. As further discussed below in conjunction with FIG. 3, any type of sensors and techniques to determine the source of the audio may be employed. In one example, the direction of arrival of the audio 108, 116 may be determined, and used at least in part to determine the source of the audio.

In the example of FIG. 1, it is determined that the source of a first recorded audio 108 is the emergency vehicle 104. The emergency vehicle 104 may be determined to be an authenticated source for external communication with the vehicle 102, for example, using at least one characteristic of the source 104, such as the visual warning devices 108. It may further be determined that the source of a second recorded audio 116 is the pedestrian 114. The pedestrian 114 may be determined to not be an authenticated source for external communication with the vehicle 102, for example since it may be classified (by an object classification system of the vehicle 102) as a pedestrian and not a LEO or first responder. As a result, the first audio 108, linked to the emergency vehicle 104, is deemed relevant to the vehicle 102 or its occupants and thus proceeds to the processing stage to identify and visualize an indicium. On the other hand, the second audio 116, associated with the pedestrian 114, does not undergo this process. This distinction facilitate that only verified and pertinent audio cues are processed and visualized, enhancing accuracy and reliability of the system in communicating critical information to the passenger(s) of the vehicle 102 or other individuals associated with the vehicle 102.

The captured audio 108 may be preprocessed and turned into audio data, to for example enhance human language in the audio 108, remove or lower background noise in the audio 108 or otherwise improve the audio 108 to facilitate the further processing thereof as discussed herein.

An indicum for an individual associated with the vehicle 102 may be determined, based at least in the audio data from the captured audio 108. The indicium may for example be based at least in part on a detected command from the source 104 of the audio 108 directed towards the vehicle 102 or a passenger of the vehicle 102. The indicum may be included in a visual representation which is generated and displayed on a display 110 in the vehicle 102.

A display in an autonomous vehicle, such as display 110 in vehicle 102, may enhance occupant experience and safety. The display 110 may be utilized for showcasing navigation details, including maps and routes, real-time traffic updates, and estimated arrival times, which are essential for efficient journey planning. Additionally, the display may act as an interface for vehicle 102 diagnostics and status reports, providing insights into vehicle health, battery levels, or fuel consumption, and system alerts. It may also serve as a communication hub, presenting incoming calls, messages, and notifications, and supports entertainment options like media playback and internet browsing, thereby enriching the in-vehicle experience for passengers. Crucially, it may visualize indicia derived from external audio sources, such as commands from emergency vehicles, ensuring that passengers are well-informed and can react promptly to surrounding events.

The visual representation displayed on display 110 may be designed to effectively communicate information processed from external audio sources 104. It may include a first portion 111 dedicated to graphical symbols or icons that encapsulate the essence of the audio cues, ranging from simplistic icons and figures to complex maps. In addition to, or as an alternative, there might be a second portion 112 for displaying the content of the audio in textual format. This portion 112 could manifest as a real-time (or nearly real-time) transcription of the spoken words captured in the audio 108, providing a direct speech-to-text conversion. Alternatively, this textual area 112 could present the essence of the command or information extracted from the audio as a concise written message or a summary, making the crucial details readily accessible and understandable to the occupants of the vehicle. In examples, a certain detected command may be mapped to graphical symbols and/or text, for example using a database of such mappings.

In the scenario depicted by FIG. 1, the processed command is identified as pertinent to a specific location in the surrounding environment that the vehicle's passenger is advised to either avoid or head towards after disembarking. For instance, the emergency vehicle 104 might utilize its public address (PA) system to issue a warning for individuals nearby to steer clear of or evacuate a particular zone deemed hazardous. In this scenario, an area to the left front corner relative to a current position of the vehicle 102 could be flagged as dangerous. In FIG. 1, the driving direction of the vehicle is indicated using a graphical element, in this example an arrow. Consequently, the display 110 within the vehicle 102 is utilized to graphically represent this area of concern, illustrating its position concerning the vehicle's current location in the environment, as exemplified in FIG. 1. Furthermore, as vehicle 102 moves through the environment, the visual representation on the display 110 may be dynamically updated to accurately reflect the new position of the vehicle 102, ensuring that the passengers are constantly informed of their relative proximity to the identified hazard.

Continuing with the theme exemplified in FIG. 1, further scenarios can involve a variety of commands communicated to the occupants of vehicle 102, advising them on how to interact with their environment. For instance, during a natural disaster, an alert may be issued for the passengers of the vehicle 102 to evacuate to a designated safe zone, with display 110 showing a mapped route to this area, dynamically updating as the vehicle 102 moves. Alternatively, in a security lockdown situation, the command might instruct avoiding specific locations due to potential threats, with display 110 highlighting safe passage routes away from these zones. In urban settings, a command could direct passengers to preferred parking areas during large public events, with the display 110 offering real-time navigation towards these spots, accounting for current traffic conditions. Each of these scenarios leverages the display 110 to not only show the areas of interest or avoidance but also to provide actionable guidance, such as paths or directions, enhancing situational awareness and safety for the passengers of the vehicle.

In a scenario where law enforcement requires direct interaction with the occupants of vehicle 102, a police command may be issued for passengers to safely exit the vehicle 102. For example, during a routine traffic stop or a security checkpoint, the police might use a loudspeaker to instruct occupants of vehicle 102 to step out and speak with officers. The display 110 could then show a visual representation of the command, including an icon of a person exiting a vehicle and/or a text prompt clarifying the instructions from the police. Additionally, the display 110 might provide guidance on safely pulling over and illustrate the correct procedure for exiting the vehicle, ensuring compliance with law enforcement requests while prioritizing the safety of both the passengers and the officers involved.

Figure 2:
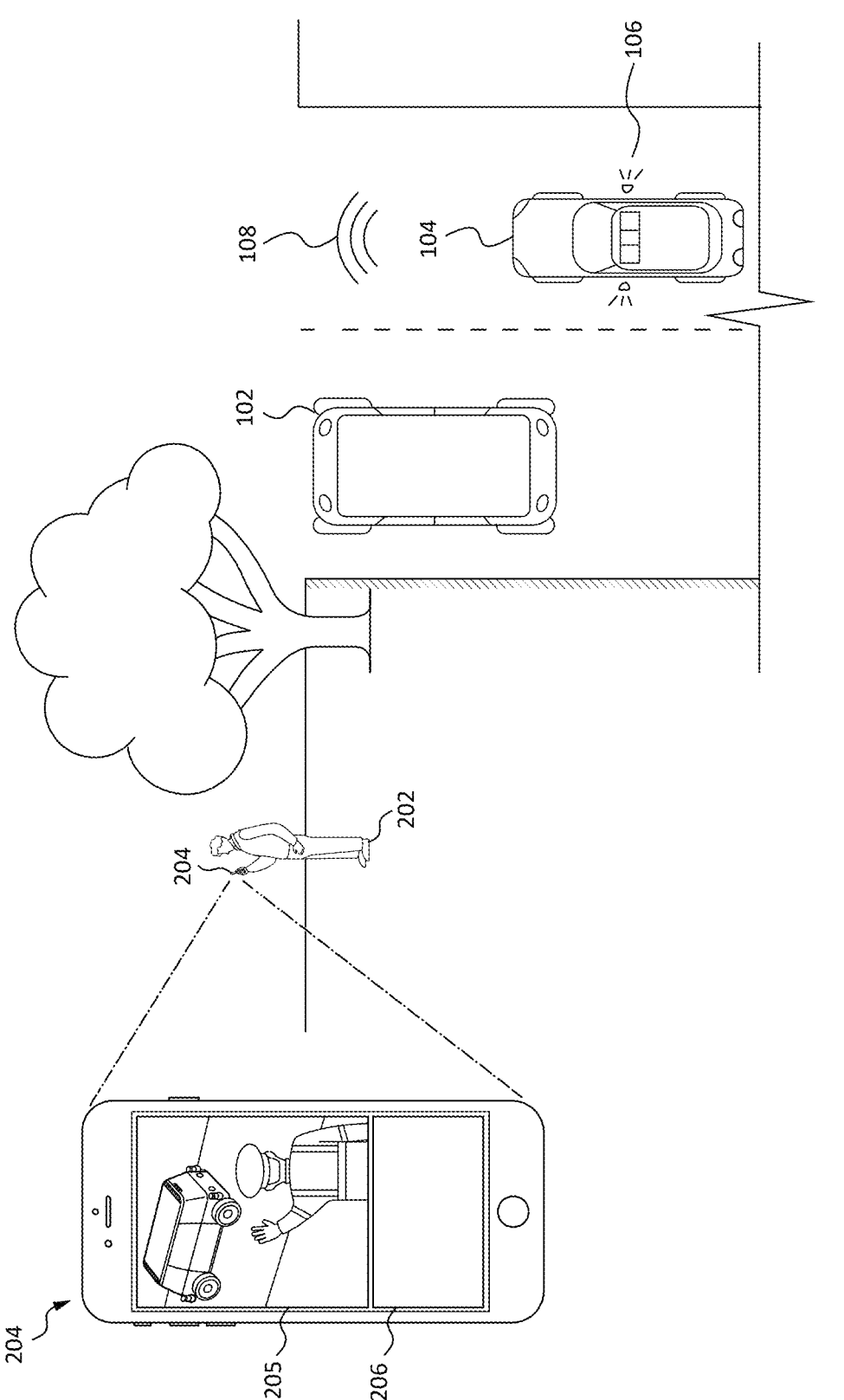
FIG. 2 is a schematic diagram illustrating an example implementation of visualization of information from external audio from an emergency vehicle, in accordance with examples of the disclosure.

FIG. 2 show an example where an individual 202 is waiting to be picked up by the vehicle 102. The individual 202 has a handheld device 204 which is associated with the vehicle 102, for example by running an application which may be used to communicate with the vehicle 102, to order pickup by the vehicle 102 and/or follow the route of the vehicle 102 while the individual 202 is waiting for the vehicle 102. Consequently, the individual 202 is considered associated with the vehicle 102, given their active engagement in awaiting transportation. It should be noted that the scenario depicted in FIG. 2 is merely illustrative, and there are various other circumstances under which an individual other than passengers of the vehicle 102 might be connected to vehicle 102. Beyond waiting for a pickup, for instance, a service technician scheduled for maintenance or repairs on the vehicle 102 also establishes an association. This connection is typically facilitated through a service appointment, where the technician is expected to perform diagnostics or conduct repairs, linking them directly to the vehicle 102. Another example might involve a delivery person that is associated with the vehicle 102 because they are scheduled to load or unload packages from it, utilizing a similar application or system to coordinate the timing and specifics of the delivery or pickup tasks.

It should be noted that using a handheld device to deliver indicia and other information to an individual is just one example. In other scenarios, a head-worn or head-mounted device, such as an augmented reality (AR), virtual reality (VR), or extended reality (XR) headset, can be employed in a similar fashion.

The scenario depicted in FIG. 2 shares similarities with that of FIG. 1, particularly regarding the emergency vehicle 104 being the source of audio 108 captured by the microphones of vehicle 102. In the scenario of FIG. 2, the audio 108 undergoes analysis, leading to the creation of a visual representation that includes an indicium, echoing the process described for FIG. 1. In the scenario illustrated by FIG. 2, audio 108 contains a command instructing vehicle 102 to pull over, from which a specific indicium is derived and visualized accordingly. The nature of this indicium can vary based on the intended recipient. For instance, a passenger within the vehicle 102 might see a visual representation (not shown in FIG. 2) guiding them on where to safely exit the vehicle. In such a case, a display of the vehicle 102 may show information as to where to exit the vehicle 102, for example. However, the visual representation for an individual 202 awaiting pickup, displayed on their handheld device 204, may differ. For example, as shown in FIG. 2, the indicium may comprise an icon or graphics indicating that the vehicle 102 the individual is waiting for has been stopped by the police. Such graphics may be shown in a first portion 204 of the graphical interface displayed on a handheld device 204 owned by the individual 202. In addition to, or as an alternative, there might be a second portion 206 for displaying such information in textual format.

The indicium shown in FIGS. 1-2 are provided by way of example. It should be noted that many other ways of indicating the content of the recorded audio, or the command determined at least in part based on the recorded audio may be implemented. The in-cabin display 110 of the vehicle 102 may be used to present a wide array of indicium, ranging from navigational aids to visual cues indicating zones of interest or areas to avoid. This information can be particularly useful in scenarios where audio commands from emergency vehicles or other sources suggest potential hazards or guidance for passengers. For example, a command from a police officer might indicate a "keep out" zone due to ongoing operations, which can be graphically represented on the vehicle's screen. The display could show a map with highlighted areas indicating restricted zones, allowing passengers to make informed decisions upon exiting the vehicle. Such zones may be inferred from gestures or audio commands from the officer. In examples, vehicle maps and/or perception systems on the vehicle can be used to determine zones that the officer may be referencing. For example, perception may detect a vehicle (such as an overturned or damaged vehicle) and infer a safe keep-away area around the detected vehicle that the officer may be referencing. In examples, a walkable area may be inferred based on the officer's command and/or gestures and found in similar fashion.

The handheld device 204 associated with the vehicle 102 may display similar or other types of indicia, such as indicia targeted for individuals who are not inside the vehicle or who do not have direct sight of it. In some examples, the indicium generated and displayed on the handheld device 204 might include a map that shows the current location of the vehicle 102, alongside the location of the audio source 104 (and/or gesture source). This can help someone outside the vehicle 102 understand where it is and how close it is to them or other points. Additionally, the display might include text or graphical representations that summarize the commands derived from the audio 108, giving further context to the individual 202.

Information presented on both on the display 110 of the vehicle 102 and the display of the handheld device 204 may be derived from various sources. For example, commands from emergency vehicles or other authenticated authorities/sources may serve as the basis for identifying critical areas or routes. Additionally, the system can infer the location and proximity of external agents by analyzing sensor data, such as radar or lidar, along with the GPS position or other location indicators of the vehicle 102 and/or the source 104. For example, output from a perception component of the vehicle 102 may be used, as further described below in conjunction with FIG. 3 and FIG. 9. These inferences may help determine which areas are safe or restricted, allowing the system to communicate this information through visual indicium on the display, and in some cases in other ways, such as playing audio in speakers, highlighting areas through projected lights, etc.

Map data can also be used when deriving such information. Such data may be received from the map component as discussed herein in conjunction with FIG. 3 and FIG. 7. By referencing existing maps, the system can identify drivable areas, pedestrian zones, and places where passengers can safely exit or should avoid. This allows the display (and possibly by other means) to guide passengers to designated drop-off points, show safe pedestrian routes, or highlight danger areas to avoid. The combination of sensor data, map data, and audio commands may provide a robust framework for informing passengers about their environment and helping them navigate safely in response to external cues.

In example, map data and/or perception data can be used to infer an area by determining a relative position of an authorized agent to a vehicle and/or the location that the agent may be gesturing and/or providing audio commands to. For example, the agent may point at a location and the relative position of the agent, the direction of the point and the elevation can be used to infer a location in the environment that the agent is referencing. In examples, audio data provided by the agent may be analyzed to determine an object or scene description that the agent is referencing. For example, the agent may ask for people to avoid a burning vehicle. In this example, the burning vehicle may be detected using perception data (e.g., an object classified as a vehicle or a damaged vehicle) and a keep away area inferred based on a threshold safe distance from the burning vehicle. In examples, a safe path that avoids the burning vehicle may be determined but using map data, for example (e.g., determining a walkable area that avoid the burning vehicle by a threshold distance). Map and/or perception data can be used to determine an object, region, or location that an external agent is referencing and/or to determine an area or path either based on the external agent's command(s) or inferred based on the object, region, or location that the agent is referencing.

In some examples, the detected commands or information derived from the audio may not only be displayed on the display 110 of the vehicle 102 or handheld device 204 but also transmitted to other vehicles or external entities, like command centers or other hubs in connection with vehicles. This form of information sharing may contribute to a broader network of communication, allowing other vehicles to receive critical updates or warnings in real-time. For instance, if the vehicle 102 captures an audio command from an emergency vehicle 104 indicating a hazard on a specific road, this information can be relayed to nearby vehicles, alerting them to the potential danger and helping them adjust their routes. Similarly, if a command is issued to clear a particular area due to ongoing emergency response, this message can be transmitted to a central command center and relayed to vehicle nearby that area. This crowd-sourced information may enable a coordinated response among various vehicles and entities, enhancing safety and efficiency in managing traffic and emergency situations. In examples, updated or annotations for maps may be sourced to other autonomous or other vehicles that may include keep-out or designated zones for people to enter.

Figure 3:
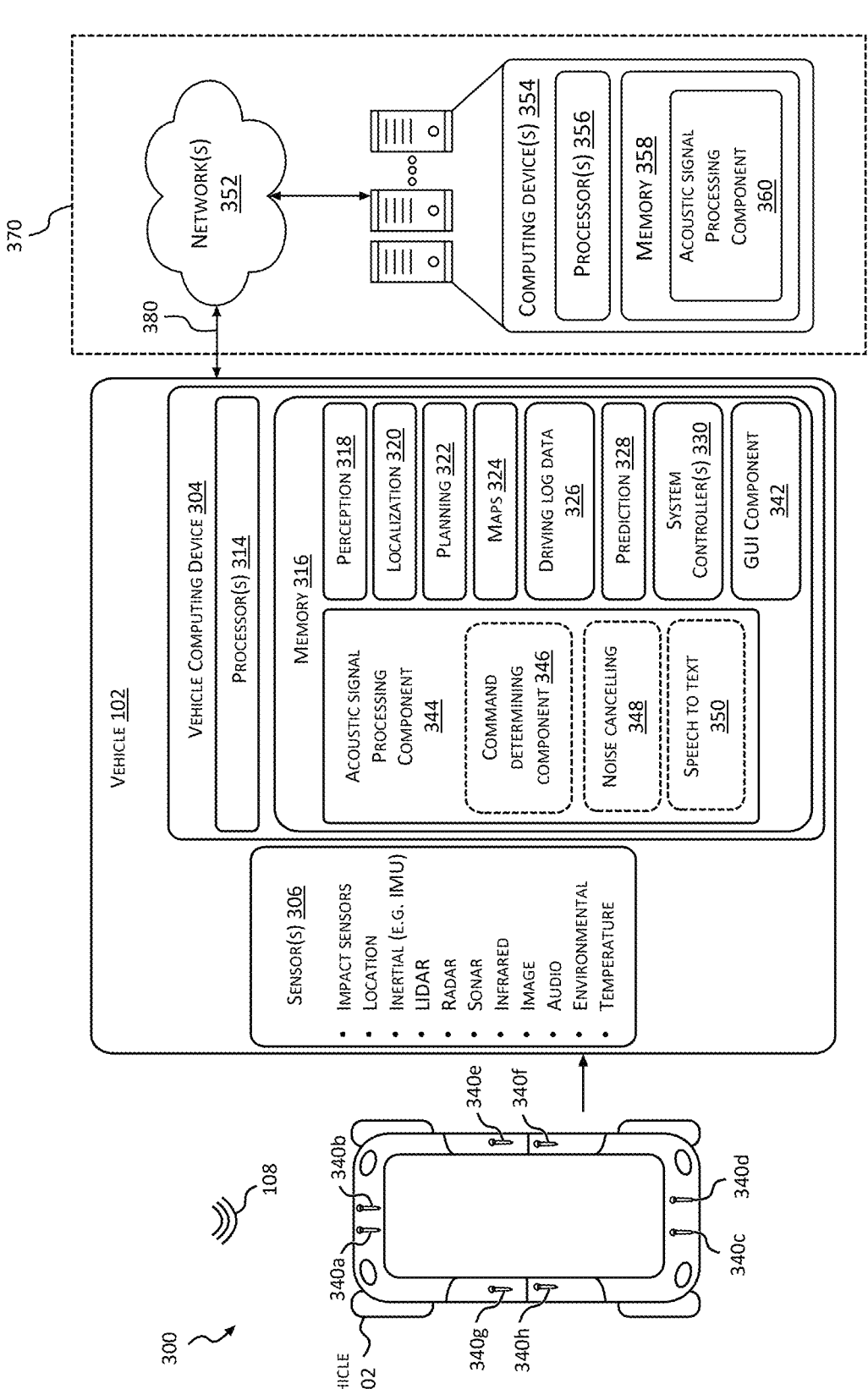
FIG. 3 depicts a block diagram of an example system for implementing the techniques described herein, in accordance with examples of the disclosure.

FIG. 3 is schematic diagram illustrating an example implementation 300 of the techniques described herein, in accordance with embodiments of the disclosure.

As illustrated in FIG. 3, the vehicle 102 may include one or more microphones 340a-h that each generates audio data representing audio 108 in an environment where the vehicle 102 is located.

In a at least one example, the vehicle 102 can be associated with sensor system(s) 306 that can be disposed on the vehicle 102. The sensor system(s) 306 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, audio sensors (e.g., microphones 340a-h), environment sensors (e.g., temperature sensors, humidity sensors, light sensors, pressure sensors, etc.), etc. The sensor system(s) 306 can generate sensor data, which can be utilized by vehicle computing device(s) 304 associated with the vehicle 102.

Audio data from the audio source(s) in the environment of the vehicle 102 may be collected, captured, received, or otherwise determined by the microphones 340a-h. The positioning of microphones 340a-h depicted in FIG. 3 serves as an example, and alternative placements can be considered. Additionally, the quantity of microphones 340a-h shown in FIG. 3 is illustrative, and various other configurations are feasible. In FIG. 3, eight microphones 340a-h are used. In other embodiments, 12 microphones may be used, with six microphones positioned on each side of the vehicle 102 in the longitudinal direction of the vehicle.

The vehicle computing device(s) 304 of the vehicle 102 may receive audio data representing audio 108 generated by the audio source(s) in the environment. The vehicle computing devices 304 comprises one or more non-transitory computer-readable media 316 storing instructions executable by one or more processors 314. The instructions may implement an acoustic signal processing component 344.

The acoustic signal processing component 344 may be comprising any of the following components: a noise cancelling component 348, a speech-to-text component 350 and a command determining component 346. The noise cancelling component 348 is an example of preprocessing performed on the audio data from the microphones 340a-h, and the acoustic signal processing component 344 may comprise further of these preprocessing components.

The speech-to-text component 350 may leverage machine learning techniques, including a range of neural networks, to accurately transcribe spoken language into written text. This encompasses everything from Neural Language Models (NLMs) to the more expansive Large Language Models (LLMs), each suited for processing and interpreting complex language patterns and nuances found in natural speech. NLMs are trained to understand the context and semantics of spoken words, enabling more accurate transcriptions even in challenging audio conditions. Such models are trained on vast datasets of speech audio, which are transcribed into text to provide the model with examples of how spoken words correspond to written language. The larger and more comprehensive these training datasets are, the better the model becomes at recognizing a wide variety of speech patterns, accents, and dialects. Large Language Models, a subset of NLMs, extend these capabilities further by being trained on even larger corpuses of text data. These models may further be used for generating coherent and contextually relevant text, such as providing summaries, understanding complex queries, and even translating between languages. Consequently, this capability enables translation between languages, catering to situations such as when the passengers of the vehicle originate from a different country than the law enforcement officer issuing the audio command.

Training data for these models can be sourced from several places. Public datasets, such as those provided by universities, research institutions, and open-source projects, offer a wealth of audio recordings and their corresponding transcriptions. Additionally, proprietary data collected from other AVs, voice assistants, customer service calls, and/or other real-world interactions provide valuable insights into everyday language use. Moreover, synthetic data generation techniques, where artificial voices are created and transcribed, can supplement real-world data, especially for underrepresented languages or dialects. This approach ensures a more inclusive and comprehensive training process, allowing the speech-to-text systems to serve a broader user base effectively.

In some examples, if the vehicle 102 itself performs all processing necessary to create a visual representation including an indicium associated with the audio 108, the acoustic signal processing component 344 may need to include all the components indicated in FIG. 3. However, if some or all of the processing is offloaded to a remote computing device 354, then the acoustic signal processing component 344 may only implement functionality to convert acoustic audio into digital audio data.

The vehicle computing device 304 of the vehicle 102 comprises a plurality of components 318-330 used for controlling the vehicle 304. For example, the vehicle computing device 304 may comprise/implement a perception component 318, localization component 320, planning component 322, map(s) 324, driving log data 326, prediction component 328, and/or system controller(s) 330. These components 318-330 will be further described below in conjunction with FIG. 7.

For example, the perception component 118 may implement an emergency vehicle detection functionality or object classification functionality (using one or more of the sensors 306). Output data from the perception component may be used to determining a source of the audio 108 and characteristics of such source. For instance, when capturing sirens from an emergency vehicle, the system 300 might use microphones 340a-h to detect the sound 108 and the direction of arrival of the sound 108, while cameras or lidar sensors confirm the visual presence and distance of the emergency vehicle, ensuring accurate identification. In another scenario, if the audio 108 originates from a pedestrian shouting, the microphones 340a-h pick up the sound, and the cameras, alongside facial recognition technology, help determine the location and emotional state of the pedestrian, indicating urgency. In another scenario, for audio cues like construction noise, microphones 340a-h identify the sound type, and RADAR along with LIDAR sensors assess the size and distance of the construction area, providing context about potential obstacles or diversions the vehicle 102 may need to navigate around.

As described herein, audio data from the microphones 340a-h may be used to determine a DOA of a particular audio component 108. In some examples, pairs of microphones 340a-h associated with the vehicle 102 generate audio data that may be used to create a locus of points in which a source of the sound may be located. For example, each pair of microphones 340a-h may be oriented along a different axis. The audio data captured by multiple pairs of audio sensors may be used to determine the DOA of an audio event and determine a distance between the audio event and the vehicle.

The vehicle computing device further comprises a graphical user interface (GUI) component 342 which may be used to determine an indicium based on the audio data/command, and to generate a visual representation including the indicium to display on a display in the vehicle.

The GUI component 342 may use other components of the vehicle computing device 304, such as for example the map(s) 324 and/or localization component 320 to generate a visual representation similar to the example of FIG. 1. The GUI component 342 may for example comprise a library of icons and graphical elements that can be used to determine the visual representation, for example based on an analysis of the command in question.

In some examples, some or all of the processing needed of the audio 108 to in the end determine an indicium and visual representation may be offloaded to a remote computing device 354 in an external computing system 370. The remote computing device 354 maintains a connection with vehicle 102 via a network 352, such as the public internet. To facilitate this interaction, vehicle 102 establishes a wireless connection 380 to the network, utilizing technologies like a 5G connection, ensuring swift and reliable data transmission.

Using the connection 380 and the network 352, the vehicle 102 may in examples transmit the audio data to the external computing device 354. The external computing device 354 may comprise an acoustic signal processing component 360 with functionality similar to or complementary to the functionality of the acoustic signal processing component 344 of the vehicle 102. For example, the external computing device 354 may be configured to receive the audio data and determine the command. The determining of the command may at least in part be implemented by applying a speech-to-text algorithm to the audio data. The external computing device 354 may then be configured to, using the network 352 and the connection 380, transmit data (such as the command) back to the vehicle 102 to be used when determining the indicium and visual representation as discussed above.

In examples, the decision for vehicle 102 to utilize the external computing device 354 for processing audio data and ultimately determining an indicium and its visual representation might hinge on various criteria. These include the availability and capacity of computing resources within vehicle 102 itself; if onboard systems are near capacity or the computational demands exceed the immediate processing capabilities of the vehicle 102, offloading to an external device 354 may be advantageous. Another consideration is the uncertainty or complexity of the command/content within the audio data; more ambiguous or intricate commands may benefit from the advanced processing capabilities of the external computing device 354. Additionally, the reliability and speed of the network 352, facilitated by connection technologies such as 5G, may play a crucial role. A robust connection 380 ensures that data transmission delays do not impact the timeliness of the delivery of the visual representation to the occupants of the vehicle 102.

Figure 4:
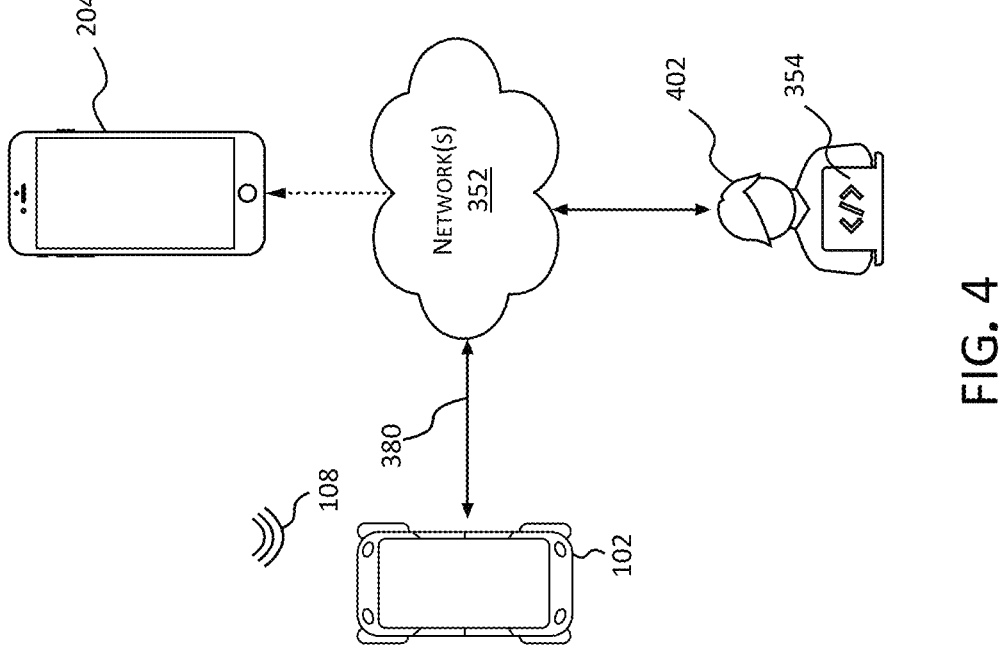
FIG. 4 is a schematic diagram illustrating an example implementation of visualization of information from external audio, in accordance with examples of the disclosure.

In some examples, for example to reduce a problem that may occur due to the uncertainty or complexity of the command/content within the audio data, a remote operator may be used to validate and possibly update the command on the external computer side. This scenario is shown in FIG. 4. The external computer 354 may be configured to display the command to the remote operator 402 and receive input from the remote operator 402 to update the command. To assist the remote operator 402 in accurately assessing and modifying the command, the audio data, or at least a relevant segment of it, may be played back to them. In some examples, also other type of sensor data, such as video data, may be shown/played to the remote operator 402 to be used for verification purposes. This procedure may facilitate a more precise verification and updating process, leveraging human judgment to navigate uncertainties or intricacies embedded within the audio data. The In examples, the command determined by the external computer 354 (and possibly updated by a remote operator 402) may be transmitted to a handheld device 204 associated with the vehicle 102 at which the audio 108 including the command was recorded. This handheld device 204 may be equipped with a GUI component designed to generate and display a visual representation of the command, including the indicium as previously discussed, specifically catering to users who may be outside of vehicle 102.

Additionally, in scenarios not depicted in FIG. 4, the vehicle 102 might directly send the command to the associated handheld device 204 (via the network 352), bypassing the need for processing by the external computer 354.

FIG. 5 depicts an example method 500 for providing a visual representation of the content of audio recorded by a vehicle traversing an environment. The method 500 may be implemented using onboard computing resources of the vehicle and optionally external computing resources as discussed above. The method 500 may be stored as instructions in one or more non-transitory computer-readable media which are executable by one or more processors to perform the process.

The method 500 comprises recording 502 audio using a microphone associated with a vehicle traversing an environment. The audio is external to the vehicle.

The method 500 further comprises determining 504, based at least in part on audio, that the audio is associated with the vehicle or an occupant of the vehicle.

The method 500 further comprises generating 506 audio data based at least in part on the audio.

The method 500 further comprises determining 508, based at least in part on the audio data, an indicium for an individual associated with the vehicle.

The method 500 further comprises providing 510 the indicium on a display associated with the vehicle for the individual.

FIG. 6 depicts another example method 600 for providing a visual representation of the content of audio recorded by a vehicle traversing an environment. The method 600 may be implemented using onboard computing resources of the vehicle and optionally external computing resources as discussed above. The method 600 may be stored as instructions in one or more non-transitory computer-readable media which are executable by one or more processors to perform the process.

The method 600 comprises recording 602 audio external to a vehicle traversing an environment using a microphone associated with the vehicle;

The method 600 further comprises determining 604 a source of the audio in the environment using one or more sensors associated with the vehicle;

The method 600 further comprises determining 606 that the source is an authenticated source for external communication with the vehicle using at least one characteristic of the source;

The method 600 further comprises analyzing 608 the audio to determine a command from the source of the audio directed towards the vehicle or a passenger of the vehicle;

The method 600 further comprises generating 610, based at least in part on the command, a visual representation including an indicium associated with the command; and The method 600 further comprises displaying 612 the visual representation on a display in vehicle.

Additional Example Vehicle System

Figure 7:
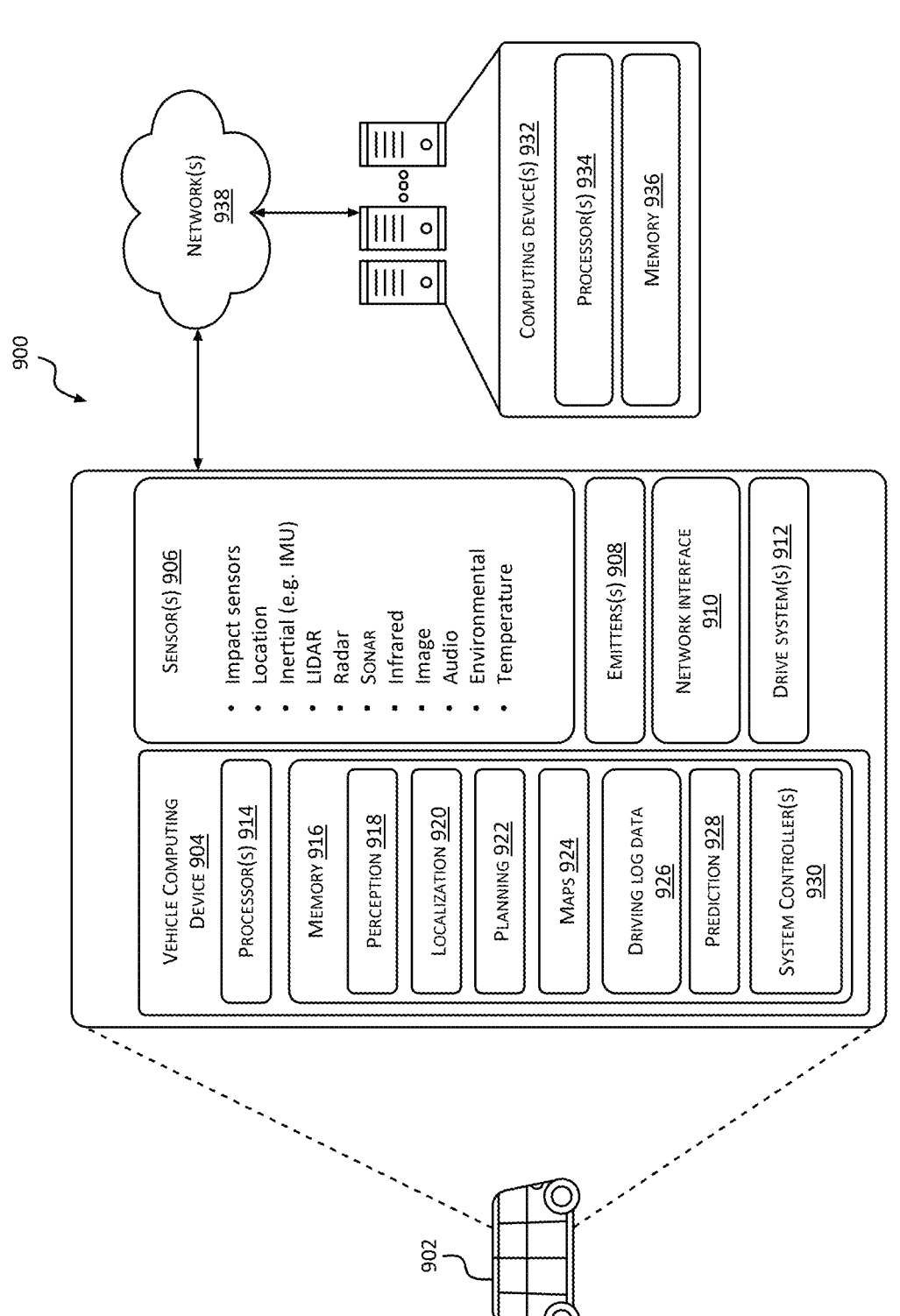
FIG. 7 depicts a block diagram of an example system for implementing the techniques described herein, in accordance with examples of the disclosure.

FIG. 7 illustrates a block diagram of an example system 900 that implements the techniques discussed herein. In some instances, the example system 900 may include a vehicle 902, which may represent the vehicle 102 in FIG. 1. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification. Moreover, in some instances, the techniques described herein may be usable by non-autonomous vehicles as well.

The vehicle 902 may include a vehicle computing device(s) 904, sensor(s) 906, emitter(s) 908, network interface(s) 910, and/or drive system(s) 912. Sensor(s) 906 may represent sensor(s) 106. The system 900 may additionally or alternatively comprise computing device(s) 932.

In some instances, the sensor(s) 906 (which corresponds to the sensors 306 in FIG. 3) may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 906 may include multiple instances of each of these or other types of sensors. For instance, the radar sensors may include individual radar sensors located at the corners, front, back, sides, and/or top of the vehicle 902. As another example, the cameras may include multiple cameras disposed at various locations about the exterior and/or interior of the vehicle 902. The sensor(s) 906 may provide input to the vehicle computing device(s) 904 and/or to computing device(s) 932.

The vehicle 902 may also include emitter(s) 908 for emitting light and/or sound, as described above. The emitter(s) 908 may include interior audio and visual emitter(s) to communicate with passengers of the vehicle 902. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 908 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 902 may also include network interface(s) 910 that enable communication between the vehicle 902 and one or more other local or remote computing device(s) (e.g., implementing the connection 380 in FIG. 3). The network interface(s) 910 may facilitate communication with other local computing device(s) on the vehicle 902 and/or the drive component(s) 912. The network interface(s) 910 may additionally or alternatively allow the vehicle to communicate with other nearby computing device(s) (e.g., other nearby vehicles, traffic signals, etc.). The network interface(s) 910 may additionally or alternatively enable the vehicle 902 to communicate with computing device(s) 932 over a network 938. In some examples, computing device(s) 932 may comprise one or more nodes of a distributed computing system (e.g., a cloud computing architecture).

The vehicle 902 may include one or more drive components 912. In some instances, the vehicle 902 may have a single drive component 912. In some instances, the drive component(s) 912 may include one or more sensors to detect conditions of the drive component(s) 912 and/or the surroundings of the vehicle 902. By way of example and not limitation, the sensor(s) of the drive component(s) 912 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 912. In some cases, the sensor(s) on the drive component(s) 912 may overlap or supplement corresponding systems of the vehicle 902 (e.g., sensor(s) 906).

The drive component(s) 912 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 912 may include a drive component controller which may receive and pre-process data from the sensor(s) and to control operation of the various vehicle systems. In some instances, the drive component controller may include one or more processors and memory communicatively coupled with the one or more processors.

The memory may store one or more components to perform various functionalities of the drive component(s) 912. Furthermore, the drive component(s) 912 may also include one or more communication connection(s) that enable communication by the respective drive component with one or more other local or remote computing device(s).

The vehicle computing device(s) 904 may include processor(s) 914 and memory 916 communicatively coupled with the one or more processors 914. Computing device(s) 932 may also include processor(s) 934, and/or memory 936. The processor(s) 914 and/or 934 may be any suitable processor capable of executing instructions to process data and perform operations as described herein. By way of example and not limitation, the processor(s) 914 and/or 934 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 916 and/or 936 may be examples of non-transitory computer-readable media. The memory 916 and/or 936 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 916 and/or memory 936 may store a perception component 918, localization component 920, planning component 922, map(s) 924, driving log data 926, prediction component 928, and/or system controller(s) 930—zero or more portions of any of which may be hardware, such as GPU(s), CPU(s), and/or other processing units.

The perception component 918 may detect object(s) in in an environment surrounding the vehicle 902 (e.g., identify that an object exists), classify the object(s) (e.g., determine an object type associated with a detected object, for example to aid determination that a source of captured audio is an authenticated source for external communication with the vehicle 902, as discussed herein), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 918 is referred to as perception data. The perception component 918 may be configured to associate a bounding region (or other indication) with an identified object. The perception component 918 may be configured to associate a confidence score associated with a classification of the identified object with an identified object. In some examples, objects, when rendered via a display, can be colored based on their perceived class. The object classifications determined by the perception component 918 may distinguish between different object types such as, for example, a passenger vehicle, a pedestrian, a bicyclist, motorist, a delivery truck, a semi-truck, traffic signage, and/or the like.

In at least one example, the localization component 920 may include hardware and/or software to receive data from the sensor(s) 906 to determine a position, velocity, and/or orientation of the vehicle 902 (e.g., one or more of an x-, y-, z-position, roll, pitch, or yaw). For example, the localization component 920 may include and/or request/receive map(s) 924 of an environment and can continuously determine a location, velocity, and/or orientation of the autonomous vehicle 902 within the map(s) 924. In some instances, the localization component 920 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 920 may provide data to various components of the vehicle 902 to determine an initial position of an autonomous vehicle for generating a trajectory and/or for generating map data, as discussed herein. In some examples, localization component 920 may provide, to the perception component 918, a location and/or orientation of the vehicle 902 relative to the environment and/or sensor data associated therewith.

The planning component 922 may receive a location and/or orientation of the vehicle 902 from the localization component 920 and/or perception data from the perception component 918 and may determine instructions for controlling operation of the vehicle 902 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 930 and/or drive component(s) 912 may parse/cause to be carried out, second instructions for the emitter(s) 908 may be formatted according to a second format associated therewith).

The driving log data 926 may comprise sensor data, perception data, and/or scenario labels collected/determined by the vehicle 902 (e.g., by the perception component 918), as well as any other message generated and or sent by the vehicle 902 during operation including, but not limited to, control messages, error messages, etc. In some examples, the vehicle 902 may transmit the driving log data 926 to the computing device(s) 932.

The prediction component 928 may generate one or more probability maps representing prediction probabilities of possible locations of one or more objects in an environment. For example, the prediction component 928 may generate one or more probability maps for vehicles, pedestrians, animals, and the like within a threshold distance from the vehicle 902. In some examples, the prediction component 928 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 922 may be communicatively coupled to the prediction component 928 to generate predicted trajectories of objects in an environment. For example, the prediction component 928 may generate one or more predicted trajectories for objects within a threshold distance from the vehicle 902. In some examples, the prediction component 928 may measure a trace of an object and generate a trajectory for the object based on observed and predicted behavior. Although prediction component 928 is shown on a vehicle 902 in this example, the prediction component 928 may also be provided elsewhere, such as in a remote computing device. In some examples, a prediction component may be provided at both a vehicle and a remote computing device. These components may be configured to operate according to the same or a similar algorithm.

The memory 916 and/or 936 may additionally or alternatively store a mapping system, a planning system, a ride management system, etc. Although perception component 918 and/or planning component 922 are illustrated as being stored in memory 916, perception component 918 and/or planning component 922 may include processor-executable instructions, machine-learned model(s) (e.g., a neural network), and/or hardware.

As described herein, the localization component 920, the perception component 918, the planning component 922, and/or other components of the system 900 may comprise one or more ML models. For example, the localization component 920, the perception component 918, and/or the planning component 922 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SEC-OND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 920 may additionally or alternatively store one or more system controller(s) 930, which may be configured to control steering, propulsion, braking, safety, emitters, communication, and other systems of the vehicle 902. These system controller(s) 930 may communicate with and/or control corresponding systems of the drive component(s) 912 and/or other components of the vehicle 902.

It should be noted that while FIG. 7 is illustrated as a distributed system, in alternative examples, components of the vehicle 902 may be associated with the computing device(s) 932 and/or components of the computing device(s) 932 may be associated with the vehicle 902. That is, the vehicle 902 may perform one or more of the functions associated with the computing device(s) 932, and vice versa.

EXAMPLE CLAUSES

A: A system comprising one or more processors; and one or more non-transitory computer-readable media storing instructions executable by the one or more processors, wherein the instructions, when executed, cause the system to perform operations comprising: recording audio external to a vehicle traversing an environment using a microphone associated with the vehicle; determining a source of the audio in the environment using one or more sensors associated with the vehicle; determining that the source is an authenticated source for external communication with the vehicle using at least one characteristic of the source; analyzing the audio to determine a command from the source of the audio directed towards the vehicle or a passenger of the vehicle; generating, based at least in part on the command, a visual representation including an indicium associated with the command; and displaying the visual representation on a display in vehicle.

B: The system of clause A, wherein the instructions further cause the system to perform actions comprising: transmitting audio data derived from the audio to a computing device external to the vehicle; determining the command at least in part by applying, at the computing device, a speech-to-text algorithm to the audio data; and transmitting the command to the vehicle.

C: The system of any one of clause A-B, wherein the instructions further cause the system to perform actions comprising: displaying the command to a remote operator associated with the vehicle; receiving input from the remote operator to update the command; and transmitting the updated command to the vehicle.

D: The system of any one of clause A-C, wherein the instructions further cause the system to perform actions comprising: determining the command as relating to an area in the environment which the passenger of the vehicle should avoid or proceed to upon exiting the vehicle; and generating the visual representation indicating the area in relation to a current position of the vehicle in the environment.

E: The system of any one of clause A-D, wherein the instructions further cause the system to perform actions comprising: generating, based at least in part on the command, a textual description of the command; and displaying the textual description on the display in the vehicle.

F: A method comprising: recording audio using a microphone associated with a vehicle traversing an environment and wherein the audio is external to the vehicle; determining, based at least in part on audio, that the audio is associated with the vehicle or an occupant of the vehicle; generating audio data based at least in part on the audio; determining, based at least in part on the audio data, an indicium for an individual associated with the vehicle; and providing the indicium on a display associated with the vehicle for the individual.

G: The method of clause F, further comprising at least one of: providing the indicium on a display within the vehicle for a passenger of the vehicle; or providing the indicium on a display of a handheld device associated with the vehicle.

H: The method of any one of clause F-G, further comprising: analyzing the audio data to determine a command directed towards the vehicle or a passenger of the vehicle; and generating, based at least in part on the command, a visual representation including the indicium associated with the command.

I: The method of clause H, further comprising: transmitting the audio data to a computing device external to the vehicle; determining the command at least in part by applying, at the computing device, a speech-to-text algorithm to the audio data; and transmitting the command to the vehicle.

J: The method of clause I, further comprising: displaying the command to a remote operator associated with the vehicle; receiving input from the remote operator to update the command; transmitting the updated command to the vehicle.

K: The method of clause J, further comprising play back at least a portion of the audio data to the remote operator.

L: The method of any one of clause F-K, further comprising: determining the command as relating to an area in the environment which a passenger of the vehicle should avoid or proceed to upon exiting the vehicle; generating the visual representation indicating the area in relation to a current position of the vehicle in the environment.

M: The method of any one of clause F-L, further comprising: generating, based at least in part on the command, a textual description of the command; and displaying the textual description on the display associated with the vehicle for the individual.

N: The method of any one of clause F-M, further comprising: determining a source of the audio in the environment using one or more sensors associated with the vehicle; and determining that the source is an authenticated source for external communication with the vehicle using at least one characteristic of the source.

O: One or more non-transitory computer-readable media storing instructions executable by one or more processors, wherein the instructions, when executed, cause the one or more processors to perform operations comprising: recording audio using a microphone associated with a vehicle traversing an environment and wherein the audio is external to the vehicle; determining, based at least in part on audio, that the audio is associated with the vehicle or an occupant of the vehicle; generating audio data based at least in part on the audio; determining, based at least in part on the audio data, an indicium for an individual associated with the vehicle; and providing the indicium on a display associated with the vehicle for the individual.

P: The one or more non-transitory computer-readable media of clause O, wherein the operations further comprise at least one of: providing the indicium on a display within the vehicle for a passenger of the vehicle; or providing the indicium on a display of a handheld device associated with the vehicle.

Q: The one or more non-transitory computer-readable media of any one of clause O-P, wherein the operations further comprise: analyzing the audio data to determine a command directed towards the vehicle or a passenger of the vehicle; and generating, based at least in part on the command, a visual representation including the indicium associated with the command.

R: The one or more non-transitory computer-readable media of clause Q, wherein the operations further comprise: transmitting the audio data to a computing device external to the vehicle; determining the command at least in part by applying, at the computing device, a speech-to-text algorithm to the audio data; and transmitting the command to the vehicle.

S: The one or more non-transitory computer-readable media of any one of clause Q-R, wherein the operations further comprise: determining the command as relating to an area in the environment which a passenger of the vehicle should avoid or proceed to upon exiting the vehicle; and generating the visual representation indicating the area in relation to a current position of the vehicle in the environment.

T: The one or more non-transitory computer-readable media of any one of clause O-S, wherein the operations further comprise: determining a source of the audio in the environment using one or more sensors associated with the vehicle; and determining that the source is an authenticated source for external communication with the vehicle using at least one characteristic of the source.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising,
one or more processors; and
one or more non-transitory computer-readable media storing instructions executable by the one or more processors, wherein the instructions, when executed, cause the system to perform operations comprising:
    recording audio external to a vehicle traversing an environment using a microphone associated with the vehicle, the vehicle an autonomous vehicle;
    determining a source of the audio in the environment using one or more sensors associated with the vehicle;
    determining that the source is an authenticated source for external communication with the vehicle using at least one characteristic of the source;
    analyzing the audio to determine a command from the source of the audio directed towards the vehicle or a passenger of the vehicle, the command comprising an instruction for a passenger of the vehicle to follow; and
    causing control of the vehicle based at least in part on the command.

2. The system of claim 1, wherein the instructions further cause the system to perform actions comprising:
    transmitting audio data derived from the audio to a computing device external to the vehicle, the computing device comprising one or more processors;
    determining the command at least in part by applying, by the one or more processors of at the computing device, a speech-to-text algorithm to the audio data; and
    transmitting the command to the vehicle.

3. The system of claim 2, wherein the instructions further cause the system to perform actions comprising:
    displaying the command to a remote operator associated with the vehicle;
    receiving input from the remote operator to update the command; and
    transmitting the updated command to the vehicle.

4. The system of claim 1, wherein the instructions further cause the system to perform actions comprising:
    determining the command as relating to an area in the environment which the passenger of the vehicle should avoid or proceed to upon exiting the vehicle;
    generating a visual representation indicating the area in relation to a current position of the vehicle in the environment; and
    displaying the visual representation on a display in the vehicle.

5. The system of claim 1, wherein the instructions further cause the system to perform actions comprising:
    generating, based at least in part on the command, a textual description of the command; and
    displaying the textual description on a display in the vehicle.

6. A method comprising:
    recording audio using a microphone associated with a vehicle traversing an environment and wherein the audio is external to the vehicle;
    determining, based at least in part on the audio, that the audio is associated with the vehicle or an occupant of the vehicle;
    generating audio data based at least in part on the audio;
    determining, based at least in part on the audio data, a command directed towards the vehicle or a passenger of the vehicle, the command comprising an instruction for the vehicle or the passenger of the vehicle to follow; and
    causing control of the vehicle based at least in part on the command.

7. The method of claim 6, further comprising:
    determining, based at least in part on the audio data, an indicium for the passenger; and
    at least one of:
        providing the indicium on a display within the vehicle for a passenger of the vehicle; or
        providing the indicium on a display of a handheld device associated with the vehicle.

8. The method of claim 7, further comprising:
    generating, based at least in part on the command, a visual representation including the indicium associated with the command.

9. The method of claim 8, further comprising:
    transmitting the audio data to a computing device external to the vehicle, the computing device comprising one or more processors;
    determining the command at least in part by applying, by the one or more processors of at the computing device, a speech-to-text algorithm to the audio data; and
    transmitting the command to the vehicle.

10. The method of claim 9, further comprising:
    displaying the command to a remote operator associated with the vehicle;
    receiving input from the remote operator to update the command; and
    transmitting the updated command to the vehicle.

11. The method of claim 10, further comprising:
    playing back at least a portion of the audio data to the remote operator.

12. The method of claim 8, further comprising:
    determining the command as relating to an area in the environment which a passenger of the vehicle should avoid or proceed to upon exiting the vehicle; and
    generating the visual representation indicating the area in relation to a current position of the vehicle in the environment.

13. The method of claim 8, further comprising:

generating, based at least in part on the command, a textual description of the command; and displaying the textual description on a display associated with the vehicle for the individual.

14. The method of claim 6, further comprising:

determining a source of the audio in the environment using one or more sensors associated with the vehicle; and determining that the source is an authenticated source for external communication with the vehicle using at least one characteristic of the source.

15. One or more non-transitory computer-readable media storing instructions executable by one or more processors, wherein the instructions, when executed, cause the one or more processors to perform operations comprising:

recording audio using a microphone associated with a vehicle traversing an environment and wherein the audio is external to the vehicle;

determining, based at least in part on the audio, that the audio is associated with the vehicle or an occupant of the vehicle;

generating audio data based at least in part on the audio;

determining, based at least in part on the audio data, a command directed towards the vehicle or a passenger of the vehicle, the command comprising an instruction for the vehicle or the passenger of the vehicle to follow; and causing control of the vehicle based at least in part on the command.

16. The one or more non-transitory computer-readable media of claim 15, wherein the operations further comprise:

determining, based at least in part on the audio data, an indicium for the passenger; and at least one of:

providing the indicium on a display within the vehicle for a passenger of the vehicle; or providing the indicium on a display of a handheld device associated with the vehicle.

17. The one or more non-transitory computer-readable media of claim 16, wherein the operations further comprise:

generating, based at least in part on the command, a visual representation including the indicium associated with the command.

18. The one or more non-transitory computer-readable media of claim 17, wherein the operations further comprise:

transmitting the audio data to a computing device external to the vehicle, the computing device comprising one or more processors;

determining the command at least in part by applying, by the one or more processors of the computing device, a speech-to-text algorithm to the audio data; and transmitting the command to the vehicle.

19. The one or more non-transitory computer-readable media of claim 17, wherein the operations further comprise:

determining the command as relating to an area in the environment which a passenger of the vehicle should avoid or proceed to upon exiting the vehicle; and generating the visual representation indicating the area in relation to a current position of the vehicle in the environment.

20. The one or more non-transitory computer-readable media of claim 15, wherein the operations further comprise:

determining a source of the audio in the environment using one or more sensors associated with the vehicle; and determining that the source is an authenticated source for external communication with the vehicle using at least one characteristic of the source.

* * * * *